United States Patent Office 3,026,671
Patented Mar. 27, 1962

---

3,026,671
ROCKET PROPULSION METHOD
William A. Barber, Springdale, Conn., assignor to American Cyanamid Company, New York, N.Y., a corporation of Maine
No Drawing. Filed Jan. 29, 1958, Ser. No. 711,794
5 Claims. (Cl. 60—35.4)

This invention relates to a reaction propulsion method and more particularly to a method of generating power by ejecting a stream of combustion products at high velocity. Rocket motors of the type used for propelling aircraft, rockets and missiles are the more important fields in which the method of the present invention is employed, although the invention in its broadest aspects is not so limited.

Modern rocket motors of the type employed to give accelerated take-off, accelerated speed in flight, or to sustain flight, for rockets, missiles, jet aircraft or conventionally powered aircraft, in essence consists of a suitable housing provided with a pair of jets adapted to inject a fuel and an oxidant therefor, respectively. The combustion of these materials, namely the fuel and the oxidant, creates a mass of hot burning gases which are ejected at high velocity through a suitable orifice with the reaction from this ejection providing powerful thrusts or propulsive forces.

It is of great importance in chemical fuels, whether they be primary fuels or a means for igniting such fuels, that they be capable of certain instant ignition to insure against power failures. This has become increasingly important in recent times, when missiles and particularly jet aircraft, when undertaking sustained climbs or power dives, are subject to what are generally referred to as "flame-outs" or power failures. If power cannot be initiated again with certainty, the device is doomed. Further, it will be apparent that it be preferred that the ignition of such fuels be independent of mechanical ignition means, such as will produce sparks and the like.

Many of the fuels currently employed in such propulsion methods or contemplated therefor, as for example, certain primary, secondary, or tertiary amines, or certain phosphines of the type disclosed in copending application, Serial No. 711,793, filed January 29, 1958, now abandoned, while proving highly effective with respect to the certainty of their ignition, in the presence of strong oxidizing agents, as well as possessing other numerous desirable characteristics, are liquids at ordinary temperatures and as such pose certain definite problems with respect to their handling during manufacture, storage, shipping and installation for use. Further, more specialized types of apparatus must be employed during their use than those necessary for the handling of fuels which remain solid and crystalline at normal temperatures and pressure.

It is a principal object of the present invention to provide a reaction propulsion method of the type employable or readily adaptable for the rocket propulsion of aircraft or missiles, which is characterized by certainty of ignition and capable of delivering powerful propulsive forces.

It is a further object of this invention to provide a fuel suitable for use in a reaction propulsion method, alone as a primary fuel, or in admixture with a second fuel as an ignition means, said second fuel being conventional, as for example, kerosene or certain of the newer chemical fuels.

It is a still further object of the present invention to provide a fuel which remains solid at normal temperatures and pressures, and is thus more readily and easily stored, shipped and utilized.

These and other objects and advantages of the present invention will become more evident from the following detailed description set forth hereinbelow.

In accordance with the present invention, I have found that dicyclopentadienylmagnesium and methyl substituted dicyclopentadienylmagnesium and mixtures thereof will ignite spontaneously upon admixture with a strong oxidizing agent, preferably strong nitric acid, to produce a stream of combustion products capable of providing powerful propulsive force in rocket motors. In addition, I have discovered that the use of dicyclopentadienylmagnesium as a rocket fuel possesses a number of other important properties, which results in it being well suited for use as a propulsive fuel.

"Methyl substituted dicyclopentadienylmagnesium," as the term is employed herein, is intended to include symmetrically substituted methyl dicyclopentadienylmagnesium, i.e. dicyclopentadienylmagnesium having a methyl group substituted on each of the hydrocarbon rings, and unsymmetrical methyl substituted dicyclopentadienylmagnesium, i.e. dicyclopentadienylmagnesium having a methyl group substituted on one of the hydrocarbon rings. The term further is intended to include mixtures thereof.

Dicyclopentadienylmagnesium, a compound having the structural formula $Mg(C_5H_5)_2$, because of the fact that it melts at temperatures above 176° C. at 760 mm. pressure and is a solid crystalline material at temperatures up to 100° C. at 760 mm. pressure, is more readily handled, shipped and stored than liquid fuels presently employed and contemplated as rocket propellants. Still further, the inclusion of dicyclopentadienylmagnesium as a component in a propellant mixture improves the efficiency of burning of the mixture, stabilizes and/or accelerates the burning rate, and results in more effective heat dissipation, all of which result in better control of the combustion process.

Dicyclopentadienylmagnesium and methyl substituted dicyclopentadienylmagnesium described hereinabove are known compounds and may be prepared in accordance with the procedure outlined in U.S. Patent No. 2,788,377. In preparing methyl substituted dicyclopentadienylmagnesium, methyl substituted cyclopentadiene may be employed in lieu of cyclopentadiene in accordance with the general procedure outlined in Example 1 of the above referred to patent. The reaction product is composed of a mixture of dicyclopentadienylmagnesium, symmetrically substituted methyl dicyclopentadienylmagnesium, and unsymmetrically substituted methyl dicyclopentadienylmagnesium. This reaction product, while a liquid at room temperature, is highly desirable as fuel in accordance with this invention. In general, dicyclopentadienylmagnesium, including the methyl derivatives thereof, are preferably employed as an ignition means for a primary fuel, as for example, low boiling hydrocarbon fuels, such as kerosene, gasoline, heptane, benzene, cyclohexene, trimethylpentene, and even certain of the newer chemical fuels.

In this connection, it should be noted that while superior results are normally obtained when the dicyclopentadienylmagnesium and methyl derivatives thereof are employed in a relatively pure state, i.e. in the absence of conventional hydrocarbon fuels, in that it possesses a higher affinity for oxygen, and is thus thermodynamically more useful, the employment of the magnesium compounds in admixture with conventional fuels constitutes an important part of this invention.

In order to obtain the rapid and positive spontaneous ignition of the magnesium compounds in the reaction propulsion system of this invention, it is essential to employ a strong oxidizing agent. Of the known strong oxidizing agents, strong nitric acid is preferred.

By "strong nitric acid," as the term is employed in the present specification, it is intended to designate nitric acid containing not more than about 10% of water. Blended nitric acid having a strength of about 95% nitric acid as $HNO_3$ is about the weakest acid that will give reliable results. However, the quenching effect of larger amounts of water can be compensated for by the presence of $NO_2$ in the nitric acid solution. Thus, nitric acid of about 96–99.5% $HNO_3$ content or fuming nitric acid containing nor more than about 8–10% of water, are the proper types of nitric acid for use in the present invention. Nitric acid known as "red fuming nitric acid" is eminently suited for use herein.

The present process consists in the generation of rocket propulsion by impinging a jet of a strong nitric acid upon a fuel containing the dicyclopentadienylmagnesium, or by co-mingling the nitric acid and fuel by other suitable means. The ratio of the oxidizing agent and the fuel will depend upon the type of fuel and upon the oxidizing potential of the oxidizing agent employed, but in general the ratio should be such as to provide a sufficient amount of oxidizing agent to oxidize from between 60 and 90% of the dicyclopentadienylmagnesium and methyl derivatives thereof.

As noted above, these magnesium compounds may be employed as a fuel, that is, as a primary fuel, or it may be dissolved or dispersed or slurried in more conventional hydrocarbon fuels, either aliphatic or aromatic in origin, to function as an ignition agent therefor, with or without the addition of other combustion agents. In view of the fact that they have relatively poor solubility, in some of these hydrocarbon fuels it is frequently necessary to disperse or slurry it in such mediums.

The rapidity of ignition of these magnesium compounds can be demonstrated by a simple test, in which a strong nitric acid is placed in a small dish and the magnesium compounds added thereto. A number of tests over a protracted period of time, involving numerous propulsive fuels, have illustrated that the results obtained thereby are reproducible and give a reliable indication of the operation of the fuel in actual test conditions or in rocket motors. Such tests are accordingly illustrated in the present invention, as will be seen in the following examples, it being understood that similar results are obtained when the same ingredients are supplied to the jets of rocket motors in the manner described.

The following examples are illustrative of the present invention. No details or enumerations contained therein should be construed as limitations on the present invention, except as they appear in the appended claims.

*Example 1*

A sample of solid dicyclopentadienylmagnesium (approximately 50–100 milligrams) was added, with proper precautions, to about 20 cc. of red fuming nitric acid in an open glass container. There was an immediate bright flash of flame. This experiment was repeated with identical results.

*Example 2*

A sample of solid, symmetrically substituted methyl dicyclopentadienylmagnesium (approximately 50–100 milligrams) was added with suitable precautions to about 20 cc. of red fuming nitric acid in an open glass container. There was an immediate bright flash of flame. This experiment was repeated with identical results.

*Example 3*

A sample of solid dicyclopentadienylmagnesium (approximately 50–100 milligrams) was added with proper precautions to about 20 cc. of liquid air in an open glass container. No obvious reaction occurred.

*Example 4*

A sample of solid dicyclopentadienylmagnesium (approximately 50–100 milligrams) was added with proper precautions to about 20 cc. of liquid oxygen in an open glass container. No obvious reaction occurred. This experiment was repeated with identical results.

*Example 5*

A liquid sample (1 drop) of a mixture of dicyclopentadienylmagnesium, symmetrically substituted methyl dicyclopentadienylmagnesium and unsymmetrically substituted methyl dicyclopentadienylmagnesium, prepared in accordance with U.S. Patent No. 2,788,377, by substituting methyl substituted cyclopentadiene for the cyclopentadiene of Example 1 therein, was added with proper precautions to 20 cc. of red fuming nitric acid in an open glass container. There was an immediate bright flash of flame. This experiment was repeated with identical results.

In addition, it should be noted that the magnesium compounds suitable for use in this invention may be employed in small quantities in conventional fuels to pep up said fuels or to improve their combustion characteristics.

I claim:

1. A rocket propulsion method which consists essentially in: admixing strong nitric acid and a compound selected from the group consisting of dicyclopentadienylmagnesium, methyl substituted dicyclopentadienlymagnesium and mixtures thereof in a combustion chamber wherein they ignite spontaneously, and ejecting the gases produced through an orifice at high velocity to produce a propulsive thrust.

2. A rocket propulsion method according to claim 1, in which strong nitric acid and dicyclopentadienylmagnesium are mixed in a combustion chamber wherein they ignite spontaneously, and ejecting the gases produced through an orifice at high velocity to produce a propulsive thrust.

3. A rocket propulsion method which consists essentially in: admixing strong nitric acid and a compound selected from the group consisting of dicyclopentadienylmagnesium, methyl substituted dicyclopentadienylmagnesium and mixtures thereof in a combustion chamber of a rocket motor in the presence of a liquid hydrocarbon fuel to ignite spontaneously, and ejecting the gases produced through an orifice at high velocity to produce a propulsive thrust.

4. A method according to claim 3, in which the liquid hydrocarbon is kerosene.

5. A rocket propulsion method consisting essentially of injecting separate streams of strong nitric acid and a compound selected from the group consisting of dicyclopentadienylmagnesium, methyl substituted dicyclopentadienylmagnesium and mixtures thereof into a combustion chamber of a rocket motor wherein they ignite spontaneously, and ejecting the gases produced through an orifice at high velocity to produce a propulsive thrust.

References Cited in the file of this patent

UNITED STATES PATENTS

| | | |
|---|---|---|
| 2,573,471 | Malina et al. | Oct. 30, 1951 |
| 2,788,377 | Barber | Apr. 9, 1957 |
| 2,818,416 | Brown et al. | Dec. 31, 1957 |
| 2,839,552 | Shapiro et al. | June 17, 1958 |

OTHER REFERENCES

Trent et al.: JARS, vol. 21, September 1951, pp. 128–131.